United States Patent [19]

Lengenfelder, Jr. et al.

[11] Patent Number: 4,571,225

[45] Date of Patent: Feb. 18, 1986

[54] SHEAVE ASSEMBLY

[75] Inventors: William G. Lengenfelder, Jr.; Paul E. Barbie, both of Bismarck, N. Dak.

[73] Assignee: Modern Machine Works Inc., Bismarck, N. Dak.

[21] Appl. No.: 666,974

[22] Filed: Oct. 31, 1984

[51] Int. Cl.⁴ .................... F16H 55/36; F16H 55/48
[52] U.S. Cl. ................................ 474/176; 474/177
[58] Field of Search ............................... 474/174–179

[56] References Cited

U.S. PATENT DOCUMENTS

| 192,562 | 7/1877 | Bushnell | 474/176 |
| 425,734 | 4/1890 | Birch | 474/176 |
| 449,322 | 3/1891 | Harris et al. | 474/176 |
| 469,512 | 2/1892 | Buswell | 474/176 |
| 829,898 | 8/1906 | Schultz | 474/176 |
| 2,637,214 | 5/1953 | Morey | 474/176 X |
| 2,685,801 | 8/1954 | Tishman | 474/176 X |
| 3,427,892 | 2/1969 | Leonard et al. | 474/176 X |
| 3,606,257 | 9/1971 | Wilson | 254/271 |
| 3,946,618 | 3/1976 | Green | 474/176 X |

Primary Examiner—John Petrakes
Attorney, Agent, or Firm—Kinney & Lange

[57] ABSTRACT

A sheave assembly for use with rope or cable. The sheave assembly includes a sheave having a hub adapted to be rotatably mounted about an axis. An annular rim is coaxially supported by the hub. The sheave further includes side flange walls adjacent the rim, defining an annular sheave groove between inner facing surfaces of the side flange walls.

The sheave assembly also includes a plurality of arcuate inserts mounted within the sheave groove in end to end relation around the rim. Outer side wall surfaces of the inserts are disposed in adjoining relationship with the inner wall surfaces of the sheave side flange walls. The arcuate inserts further include a center groove formed therein upon which a cable or rope bears.

Detachable perimeter bands extend around outer edge portions of each sheave side flange wall and adjacent portions of the inserts. These bands serve to detachably secure the arcuate inserts within the sheave groove.

20 Claims, 5 Drawing Figures

U.S. Patent  Feb. 18, 1986  Sheet 1 of 3  4,571,225

SHEAVE ASSEMBLY

BACKGROUND OF THE INVENTION

1. Field of the Invention

The present invention relates generally to a sheave assembly, and particularly to a sheave assembly having replacable arcuate inserts disposed around a sheave rim, forming an annular wear surface around which a line or cable travels.

2. Description of the Prior Art

Sheaves are commonly used to guide rope or cable under heavy strain. The sheave rim or wear surface, around which the cable travels, wears out quite rapidly due to the friction caused by its incessant rubbing engagement with the rope or cable. To avoid having to replace the entire sheave, which is expensive and difficult to replace, sheaves having a replaceable rim or wear surface have been developed.

To replace the wear surface (rim) of some sheaves, it is necessary to disturb the position of the rope or cable. Indicative of this are sheaves formed with their wear surface sections attached end to end, as disclosed by U.S. Pat. No. 449,322 to Harris and Thomas, U.S. Pat. No. 192,562 to Bushnell and U.S. Pat. No. 3,427,892 to Leonard et al., as well as sheaves held together by cross bolts, as disclosed in U.S. Pat. No. 2,685,801 to Tishman.

Other types of sheaves have replaceable wear surface sections bolted to the rim of the sheave. Representative of this type of sheave are U.S. Pat. No. 829,898 to Schultz and U.S. Pat. No. 425,734 to Birch.

U.S. Pat. No. 469,512 to Buswell discloses a sheave having side flanges adjacent the sheave rim, defining a central groove around the periphery of the sheave. Replaceable wear surface inserts, each insert comprising separate side flange members and a separate wear surface element, are assembled and fixed within the central groove by cross bolts threaded through a sheave side flange into engagement with both insert side flange members.

U.S. Pat. No. 2,637,214 to Morey discloses wear surface segments fastened around a sideless sheave rim by fasteners such as hoops, straps or cables. However, the segments are without lateral support when disposed around the sheave rim.

U.S. Pat. No. 3,606,257 to Wilson discloses elastomeric or elastic band type members that extend around the sheave. These members act as a slip clutch, and not as a device for holding the sheave sections together.

SUMMARY OF THE INVENTION

The sheave assembly of the present invention includes a hub adapted to be rotatably mounted about an axis. An annular rim is coaxially supported by the hub and annular side flange walls are disposed adjacent the rim, defining an annular sheave groove between inner facing surfaces of the side flange walls.

The present invention further includes a plurality of arcuate inserts mounted within the sheave groove in end to end relation around the rim. Outer side wall surfaces of the inserts are disposed in adjoining relationship with the inner wall surfaces of the sheave side flange walls. The arcuate inserts further include a center groove formed therein upon which a cable or rope bears.

Detachable perimeter bands extend around outer edge portions of each of the sheave side flange walls and adjacent portions of the inserts. These bands detachably secure the arcuate inserts within the sheave groove.

DETAILED DESCRIPTION OF THE PREFERRED EMBODIMENTS

Figure 1:
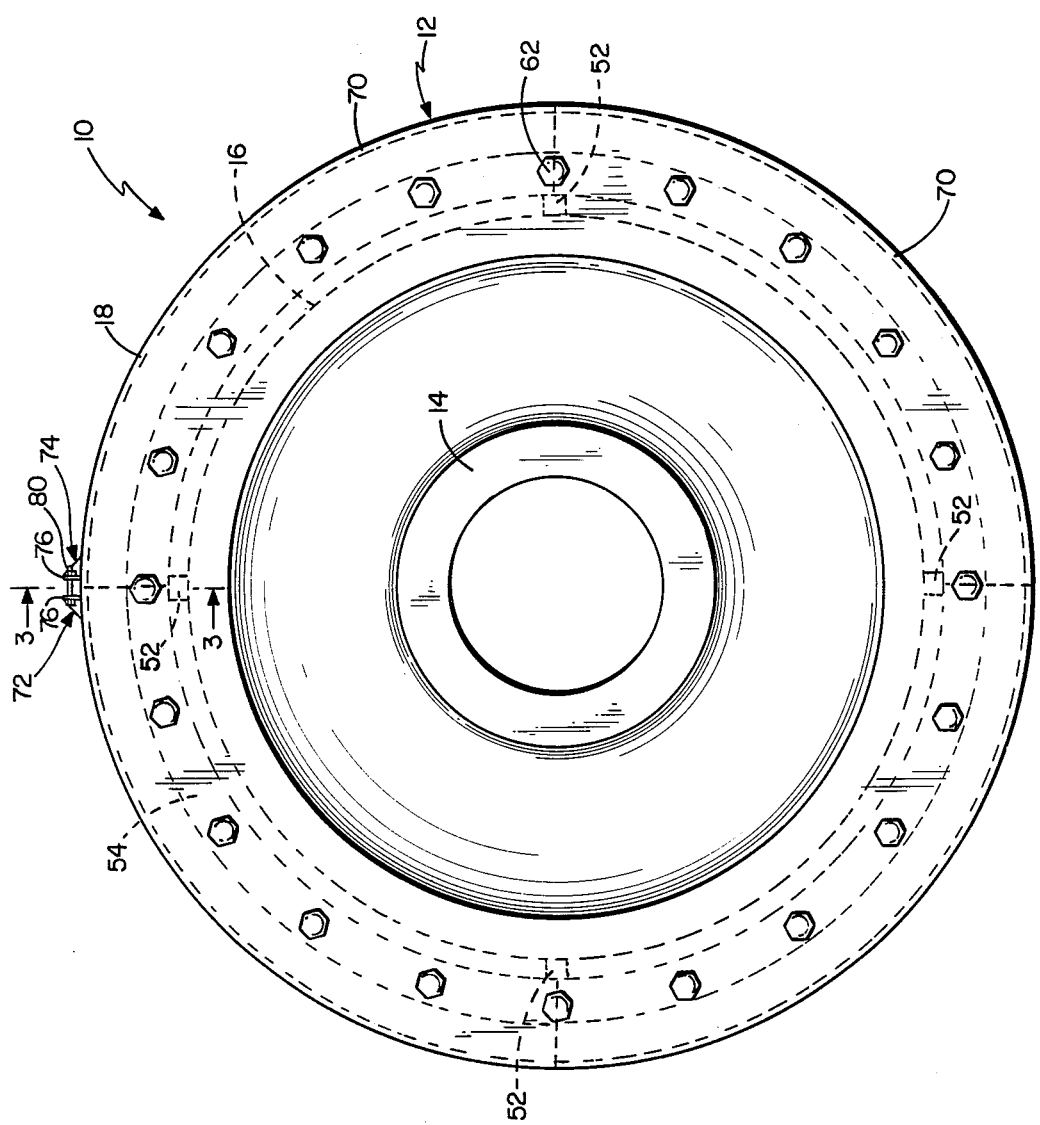
FIG. 1 is a front plan view of a first form of the sheave assembly of the present invention.

A sheave assembly made according to the present invention is indicated generally at 10 in FIG. 1. Sheave assembly 10 includes a sheave 12 having a hub 14 adapted to be rotatably mounted on a support shaft about a central axis. An annular rim 16 is integral with and coaxial with the hub 14. Sheave 12 further includes annular sheave side flange walls 18 disposed adjacent rim 16.

Figure 3:
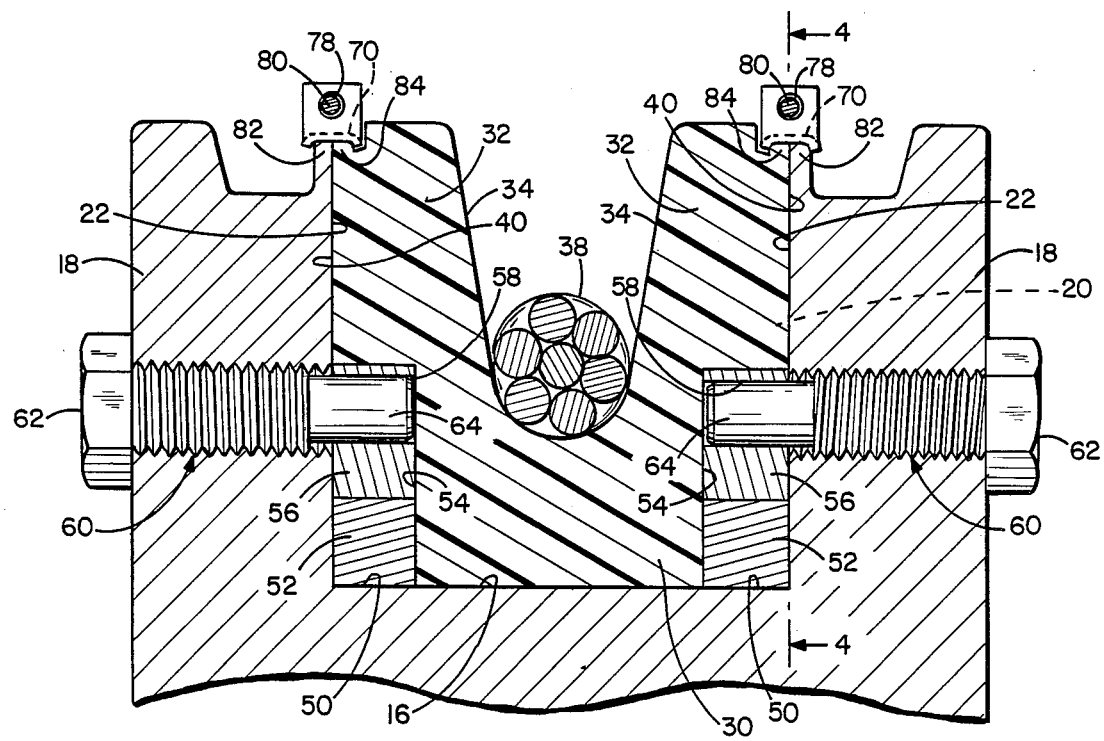
FIG. 3 is a fragmentary sectional view, taken along the line 3—3 in FIG. 1.

As shown in FIG. 3, sheave side flange walls 18 preferably have inner wall surfaces 22 substantially normal to the rim 16, defining a sheave groove 20 therebetween. Sheave groove 20 is arranged to receive a plurality of arcuate inserts 30 in end to end relation around the rim 16. When so positioned, inserts 30 form a wear surface around rim 16 which support a line, such as a cable or rope.

Arcuate inserts 30, as illustrated in FIG. 3, include arcuate insert side walls 32 having inner wall surfaces 34 forming a groove and having outer wall surfaces 40 that face the inner wall surfaces 22 of sheave side flange walls 18. When the inserts 30 are positioned in place in the sheave 10, sheave side flange walls 18 thus provide lateral support and serve to locate the arcuate inserts 30. The groove formed by inner wall surfaces 34 support a line such as a cable or wire rope 38.

Figure 2:
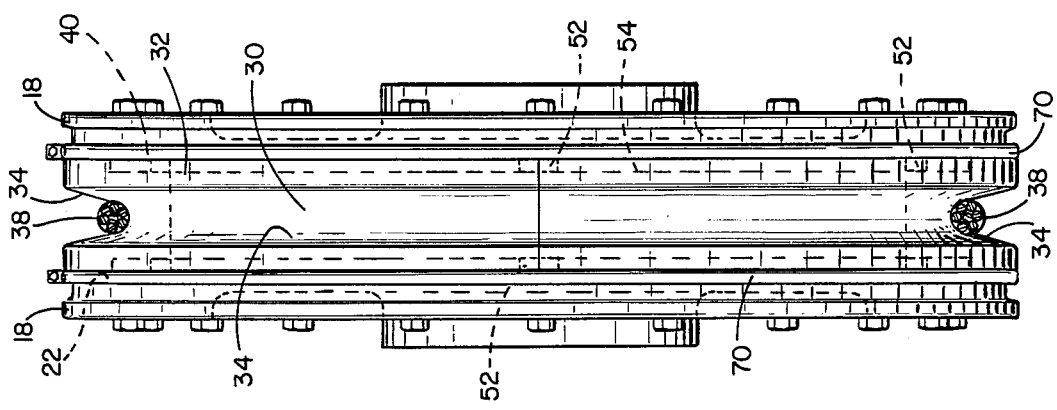
FIG. 2 is a side view of the sheave assembly of FIG. 1 showing a section of wire rope disposed in a center sheave groove.

To prevent inserts 30 from sliding or moving within sheave groove 20 when the line or cable 38 is loaded and moves to cause rotation of the sheave 10, keyways 50 are provided at the ends of the inserts 30 for receiving transverse keys 52. The transverse keys 52 are fixed in place relative to sheave side flange walls 18 at the bottom of groove 20 (for example by welding) and serve as an abutment for inserts 30. Although any number of transverse keys 52 may be used, it has been found that transverse keys 52 at each end to end juncture of the arcuate inserts 30, as shown in FIGS. 1 and 2, provide sufficient support.

Although the sheave assembly 10 may also be constructed to receive any desired number of inserts 30, it is preferable to construct sheave assembly 10 to receive four inserts 30, which define quarter circles conforming to the curvature of the sheave rim 16. This limits the number of inserts 30 which have to be replaced while leaving at least one insert 30 free and clear of the line 38, since cable or line 38 seldom extends more than 270 degrees around the wear surface 34 of sheave assembly 10 at any given time.

The inserts 30 are retained within the sheave groove 20 by a pair of substantially annular perimeter bands 70. In a first form of the invention, each of the inserts 30 is also independently retained within groove 20, such as by a key/bolt combination described below. The independent retaining system ensures that the inserts 30 will be held securely and will not fall out of groove 20 when the annular bands 70 are removed.

Figure 4:
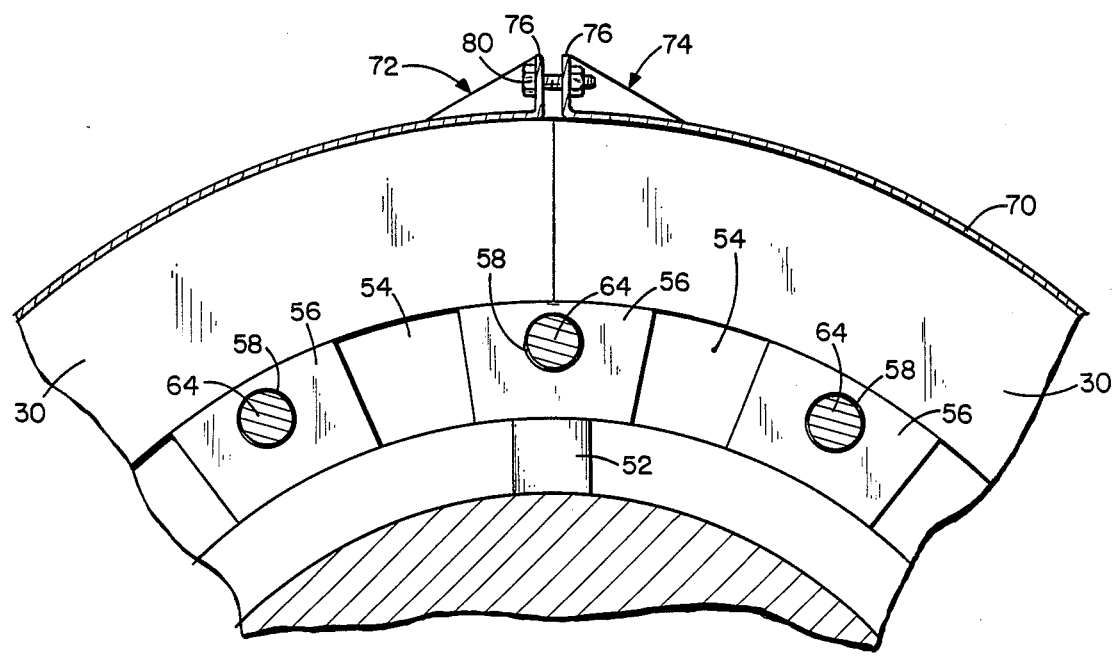
FIG. 4 is sectional view of a portion of the sheave assembly taken along the line 4—4 in FIG. 3.

The independent retaining system is shown in detail in FIGS. 3 and 4. As shown in FIG. 4, arcuate inserts 30 have an external, annular groove or keyway 54 defined in the outer wall surfaces 40 of the inserts 30. Sheave side flange walls 18 also include internally threaded apertures 60 which are aligned with the external grooves 54 in the inserts 30.

Part annular keys 56 mate with the external grooves 54. Each key 56 is arranged to be positioned in the external groove 54 and has a key aperture 58 axially aligned with one of the sheave side flange wall apertures 60. The keys 56 may be spaced apart as shown in FIG. 4, or they may be of sufficient arcuate length to abut the next adjacent key 56.

Bolts 62 are threaded through the sheave side flange wall apertures 60. Each bolt 62 has a dowel key end portion 64 which fits into the key aperture 58 of one key 56, to fix the position of each of the keys 56 within the external grooves 54 relative to the sheave side flange walls 18. Keys 56 prevent the arcuate inserts 30 from moving radially relative to the sheave groove 20 during use and prevents removal of the inserts 30 until the bolts 62 are removed or are at least backed off until the dowel end portions 64 clear their respective key 56.

As stated above, inserts 30 are also retained within sheave groove 20 by a pair of substantially annular bands 70, having adjustable perimeter length. As shown in FIGS. 3 and 4, each band 70 has a first end 72 and a second end 74 and an outward projecting lug 76 is mounted adjacent each end. Lugs 76 face each other and each has an aperture 78 aligning with the aperture 78 of the other lug 76.

A band tightening mechanism, such as draw bolt 80, extends through apertures 78 of each band. By tightening the draw bolts 80, the respective first end 72 and second ends 74 are drawn together, to reduce the perimeter length of bands 70. In a first form of the invention, the lugs 76 extend radially outwardly from the bands 70. Draw bolt 80 will then be in an easily accessible position for tightening or loosening the bands 70.

Bands 70 have a U-shaped cross section and overlie annular outer edge wall portions 82 of the sheave side flange walls 18 and adjacent part annular outer edge wall portions 84 of the respective insert side walls 32 in adjoining relation therewith. The bands 70, when fastened with draw bolt 80, substantially encircle the sheave. By tightening each draw bolt 80, each band 70 is tightened around the respective outer wall portions 82 and 84, holding the adjoining sheave and insert side flange walls together. This secures the arcuate inserts 30 within the sheave groove 20, until the draw bolts 80 are loosened and the bands 70 are removed. If desired, U-shaped clips may be used at spaced intervals around the sheave 10 with the band 70 actually bearing against the clips to hold the inserts 30 in place.

To ensure proper alignment of bands 70 around adjoining sheave and insert side flanges, and to prevent bands 70 from slipping off the outer edge annular wall portions 82 and 84, the outer edge wall portions 82 and 84 are formed by grooves that provide clearance for the sides of the band 70. These grooves further provide sufficiently wide wall portions so when band 70 is tightened, the outer edge wall portions 82 and 84 are held tightly together between the sides of band 70.

Although the first embodiment of the present invention has been described with the independent retaining system, namely the keys 56 and bolts 62, they are not needed in all cases, as the annular bands 70 retain the arcuate inserts 30 within the sheave groove 20 by themselves.

Figure 5:
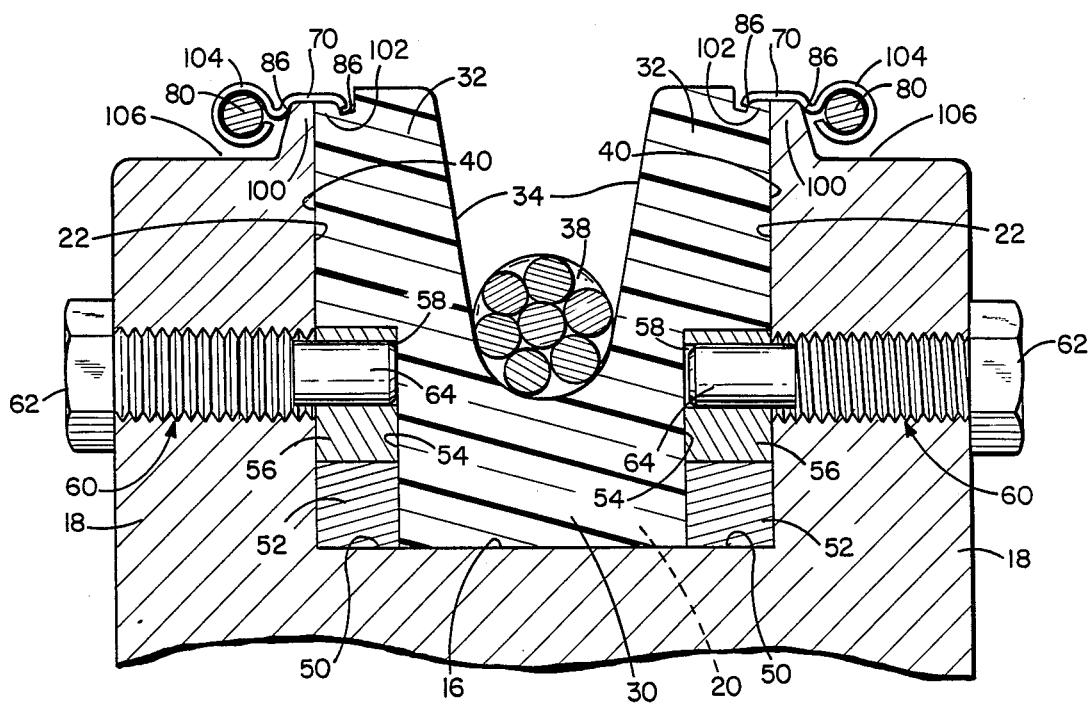
FIG. 5 is a sectional view similar to FIG. 3, of an outer portion of a second form of the sheave assembly of the present invention.

In a second form of the present invention, as disclosed in FIG. 5, the sheave side flange walls 18 have outer edge wall portions 100 and the insert side flanges 32 have outer edge wall portions 102. The outer surfaces of the wall portions 100 and 102 taper outwardly from each other in direction toward the axis of rotation. The engaging edges 86 of bands 70 also taper, and act to move the respective wall portions toward each other as the bands 70 are tightened.

As also indicated in FIG. 5, the ends of the bands 70 include apertured tightening lugs 104 which are positioned on the lateral sides of the bands 70 and do not extend radially outwardly from the bands 70 any substantial amount. When a sheave assembly 10 is used in close quarters, the position of lugs 104 shown in FIG. 5 makes the lugs less likely to interfere with the operation or rotation of the sheave assembly 10. The sheave side flange walls 18 may have suitable recesses 106 which permits the tightening lugs 104 to be placed on the sides of the bands 70.

As the sheave 10 is used, the cable will tend to wear the groove formed by surfaces 34 of the inserts 30, the inserts 30 then can be replaced without removing the cable or line 38 from the sheave 10. This is done by removing the annular bands 70 from the sheave 10, and removing or backing out the dowel key end portion 64 of the bolts 62 in an insert 30 that is not supporting the cable 38. At least one insert 30 will be removable and, when removed, a new insert 30 including one or more keys 56 will be placed in the sheave 10. Bolts 62 are then retightened into engagement with key apertures 58 of part annular keys 56. The cable 38 can then be moved by the winch or device controlling it to cause the sheave 10 to rotate to a new position so another worn insert 30 is removable, which will then also be replaced in the manner described above. All inserts 30 can be replaced in this manner without removing the cable 38 from the sheave 10 or the sheave from its support. When the inserts 30 have all been replaced, the bands 70 will be reinstalled to complete the job.

It will also be apparent to those skilled in the art that a number of other modifications and changes can be made without departing from the spirit and scope of the present invention. Therefore, it is to be understood that the invention is not limited except by the claims which follow.

I claim:

1. A sheave assembly for use with a line such as a cable, comprising:
   a sheave including a hub adapted to be rotatably mounted about an axis, an annular rim coaxially supported by the hub, and annular sheave side flange walls adjacent the rim, having inner facing surfaces defining an annular sheave groove therebetween;
   a plurality of arcuate inserts mounted within the sheave groove in end to end relation around the rim, having outer side wall surfaces disposed in adjoining relation with the inner wall surfaces of the sheave side flange walls, and said arcuate inserts having a center groove formed therein upon which a line is supported; and a separate detachable perimeter band extending around the outer edges of each of the sheave side flange walls and adjacent portions of the inserts for detachably securing the inserts within the sheave groove.

2. The sheave assembly of claim 1 wherein:

the outer edges of the sheave side flange walls have a second groove defined therein adjacent the sheave groove to form first wall portions adjacent the sheave groove;

the outer edges of the adjacent portions of the inserts have a side groove defined therein adjacent the center groove to form second wall portions adjacent the inner surfaces of the sheave groove respectively; and the perimeter bands each comprise a U-shaped cross section member spanning the adjacent first and second wall portions on one side of the sheave groove respectively, and means for adjusting the perimeter length of the respective bands.

3. The sheave assembly of claim 2 wherein the outer surfaces of the first wall portions of the sheave and the second wall portions of the inserts taper outwardly from each other in direction toward the axis of rotation, the U-shaped cross section member tending to clasp the adjacent first and second wall portions toward each other as the bands are tightened.

4. The sheave assembly of claim 2 wherein:

the perimeter band includes a first and second end, and an outward projecting lug having an aperture mounted adjacent each end with the apertures axially aligned with each other; and the means adjusting the perimeter length comprises a separate draw bolt extending through the apertures of the first and second end lugs of each band.

5. The sheave assembly of claim 1 wherein:

the arcuate inserts further include transverse key engaging means; and further comprising:

a plurality of transverse keys fitting into the transverse key engaging means and transversely projecting into the sheave groove at each junction of the arcuate insert ends.

6. The sheave assembly of claim 5 wherein:

the transverse key engaging means comprises a transverse keyway at the ends of the arcuate inserts.

7. The sheave assembly of claim 1 wherein the arcuate inserts comprise four arcuate inserts defining quarter circles conforming to the curvature of the sheave rim.

8. The sheave assembly of claim 1 further comprising second means other than the perimeter band for independently retaining the arcuate inserts in the sheave groove.

9. The sheave assembly of claim 8 wherein the second means for independently retaining comprises:

annular external grooves in the outer side wall surfaces of the inserts which face the inner facing surfaces of the sheave side flange walls;

internally threaded apertures through the sheave side flange walls, algined with the external grooves in the outer side wall surfaces of the inserts; and further comprising:

key means for retaining the inserts in position, the key means positioned within and mating in radial cross section with the external grooves, and including apertures axially aligned with the sheave side flange wall apertures when in place in the external grooves; and bolt means threaded through the sheave side flange wall apertures and having dowel end portions which fit within the respective apertures of the key means, for fixing the position of the key means within the external grooves relative to the sheave side flange walls.

10. A sheave assembly for use with a line such as a cable, comprising:

a sheave including a hub adapted to be rotatably mounted about an axis, an annular rim coaxially supported by the hub, and annular sheave side flange walls adjacent the rim, having inner facing surfaces defining an annular sheave groove therebetween;

a plurality of arcuate inserts mounted within the sheave groove in end to end relation about the rim, the inserts having part annular side walls with opposing outer side wall surfaces disposed in adjoining relation with inner surfaces of the sheave side flange walls, and having inner side wall surfaces converging to form a grooved wear surface upon which the line is supported; and detachable fastening means extending over and around a first outer edge portion of each sheave side flange wall and adjacent first outer edge portions of the insert side walls, for detachably securing the arcuate inserts within the sheave groove.

11. The sheave assembly of claim 10 wherein:

the outer edges of the sheave side flange walls have a second groove defined therein adjacent the sheave groove to form first wall portions adjacent the sheave groove;

the outer edges of the adjacent insert side walls have a side groove defined therein adjacent the center groove to form second wall portions adjacent the inner surfaces of the sheave groove respectively; and the detachable fastening means comprises a separate detachable perimeter band comprising a U-shaped cross section member spanning the adjacent first and second wall portions on one side of the sheave groove respectively, and means for adjusting the perimeter length of the respective bands.

12. The sheave assembly of claim 11 wherein:

each perimeter band includes a first and second end, and an outward projecting lug having an aperture mounted adjacent each end with the apertures axially aligned with each other; and the means adjusting the perimeter length comprises a separate draw bolt extending through the apertures of the first and second end lugs of each band.

13. The sheave assembly of claim 10 wherein:

the arcuate inserts further include a transverse keyway at each of its ends; and further comprising:

a plurality of transverse keys fitting into the transverse keyways andtransversely projecting into the sheave groove at each junction of the arcuate insert ends.

14. The sheave assembly of claim 10 further comprising second means other than the perimeter band for independently retaining the arcuate inserts in the sheave groove.

15. The sheave assembly of claim 14 wherein the second means for independently retaining comprises:

annular external grooves in the outer surface of the insert side walls which face the inner facing surfaces of the sheave side flange walls;

internally threaded apertures through the sheave side flange walls, aligned with the external grooves in the outer surface of the insert side walls; and further comprisng:

key means for retaining the inserts in position, the key means positioned within and mating in radial cross section with the external grooves, and including apertures axially aligned with the sheave side flange wall apertures when in place in the external grooves; and bolt means threaded through the sheave side flange wall apertures and having dowel end portions which fit within the respective apertures of the key means, for fixing the position of the key means within the external grooves relative to the sheave side flange walls.

16. A sheave assembly for use with a line such as a cable, comprising:

a sheave including a hub adapted to be rotatably mounted about an axis, an annular rim coaxially supported by the hub, an annular sheave side flange walls adjacent the rim, having inner facing surfaces defining an annular sheave groove therebetween;

a plurality of arcuate inserts mounted within the sheave groove in end to end relation around the rim, having outer side wall surfaces disposed in adjoining relation with the inner wall surfaces of the sheave side flange walls, said arcuate inserts having a center groove formed therein upon which a line is supported, and a transverse keyway at the ends of the arcuate inserts for engaging transverse keys;

a plurality of transverse keys fitting into the transverse keyway of the inserts and transversely projecting into the sheave groove at each junction of the arcuate insert ends; and a separate detachable perimeter band extending around the outer edges of each of the sheave side flange walls and adjacent portions of the inserts for detachably securing the inserts within the sheave groove.

17. The sheave assembly of claim 16 wherein:

the outer edges of the sheave side flange walls have a second groove defined therein adjacent the sheave groove to form first wall portions adjacent the sheave groove;

the outer edges of the adjacent portions of the inserts have a side groove defined therein adjacent the center groove to form second wall portions adjacent the inner surfaces of the sheave groove respectively; and the perimeter bands each comprise a U-shaped cross section member spanning the adjacent first and second wall portions on one side of the sheave groove respectively, and means for adjusting the perimeter length of the respective bands.

18. The sheave assembly of claim 17 wherein:

the perimeter band includes a first and second end, and an outward projecting lug having an aperture mounted adjacent each end with the apertures axially aligned with each other; and the means adjusting the perimeter length comprises a separate draw bolt extending through the apertures of the first and second end lugs of each band.

19. The sheave assembly of claim 16 further comprising second means other than the perimeter band for independently retaining the arcuate inserts in the sheave groove.

20. The sheave assembly of claim 19 wherein the second means for independently retaining comprises:

annular external grooves in the outer side wall surfaces of the inserts which face the inner facing surfaces of the sheave side flange walls;

internally threaded apertures through the sheave side flange walls, aligned with the external grooves in the outer side wall surfaces of the inserts; and further comprising:

key means for retaining the inserts in position, the key means positioned within and mating in radial cross section with the external grooves, and including apertures axially aligned with the sheave side flange wall apertures when in place in the external grooves; and bolt means threaded through the sheave side flange wall apertures and having dowel end portions which fit within the respective apertures of the key means, for fixing the position of the key means within the external grooves relative to the sheave side flange walls.

* * * * *